(No Model.) 2 Sheets—Sheet 1.

H. T. SIDWAY.
LETTER BOX.

No. 391,201. Patented Oct. 16, 1888.

WITNESSES:
C. Neveux
C. Sedgwick

INVENTOR.
H. T. Sidway.
BY Munn & Co.
ATTORNEY.

(No Model.) 2 Sheets—Sheet 2.
H. T. SIDWAY.
LETTER BOX.
No. 391,201. Patented Oct. 16, 1888.
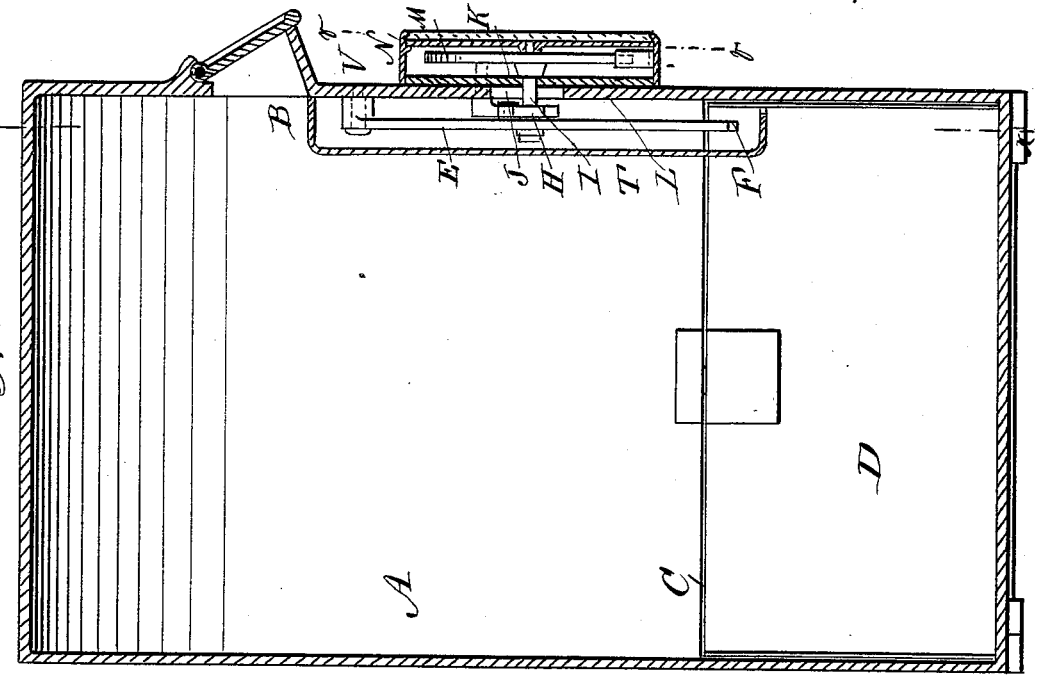
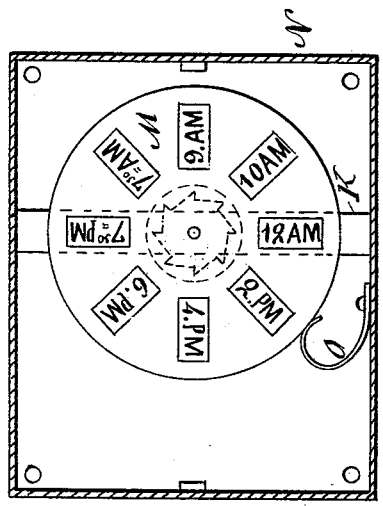
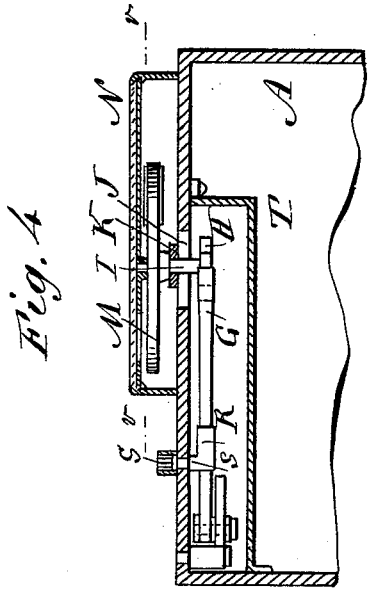
WITNESSES:
C. Neveux
C. Sedgwick
INVENTOR.
H. T. Sidway.
BY Munn & Co
ATTORNEY.

UNITED STATES PATENT OFFICE.

HENRY T. SIDWAY, OF CHICAGO, ILLINOIS.

LETTER-BOX.

SPECIFICATION forming part of Letters Patent No. 391,201, dated October 16, 1888.

Application filed March 29, 1888. Serial No. 268,742. (No model.)

*To all whom it may concern:*

Be it known that I, HENRY T. SIDWAY, of Chicago, in the county of Cook and State of Illinois, have invented a new and useful Improvement in Street Mail-Boxes, of which the following is a full, clear, and exact description.

This invention relates to an improvement in street mail-boxes provided with mechanism for indicating the times of collection, arranged to be operated by the door through which the mail-matter is removed by the postman.

The main object of this improvement is to provide for conveniently preventing the operation of the indicator by the door, when not desired, as in the case of Sunday or special collections, and to facilitate its application to mail-boxes in use.

The invention consists of a novel construction and combination of parts, substantially as hereinafter described, and distinctly pointed out in the claims.

Reference is to be had to the accompanying drawings, forming a part of this specification, in which similar letters of reference indicate corresponding parts in all the figures.

Figure 1:
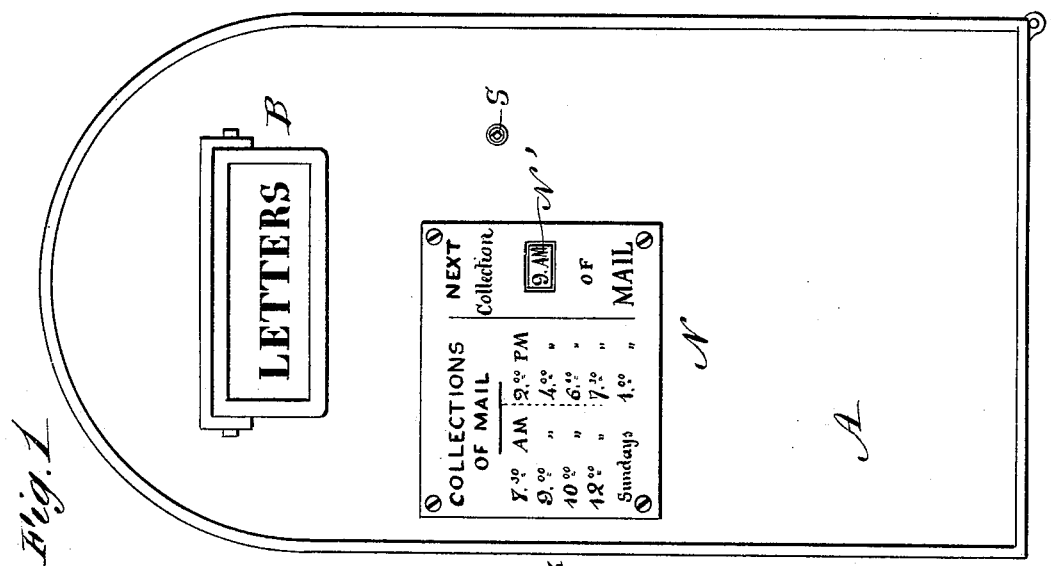
Figure 2:
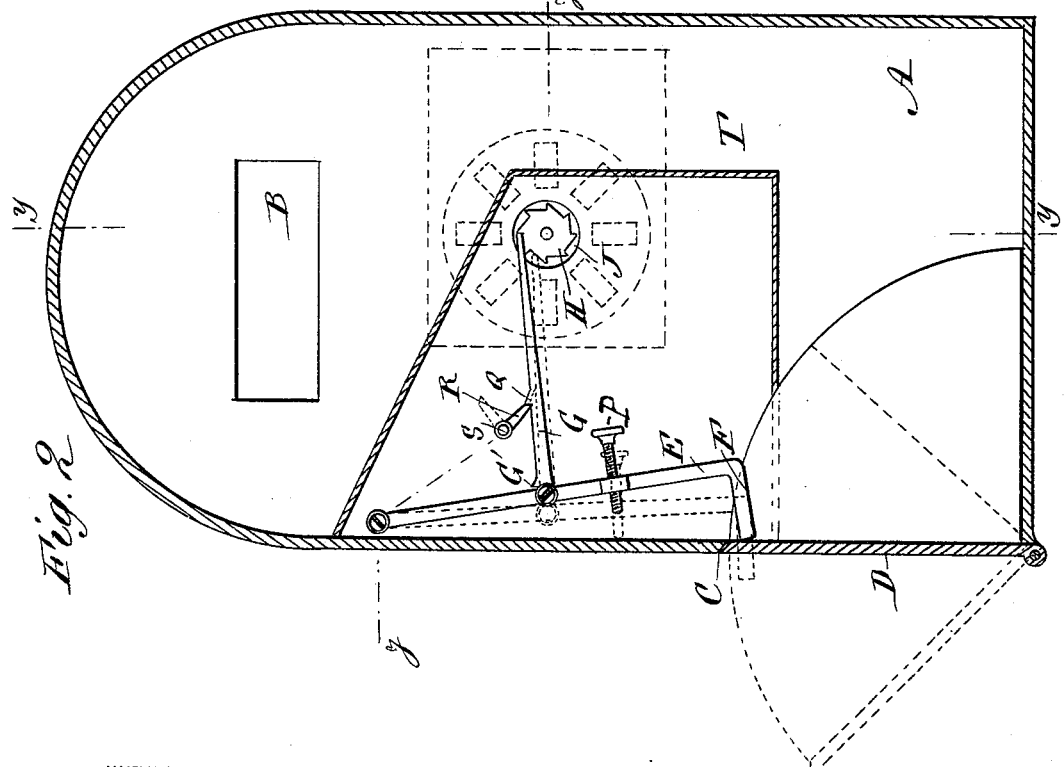

Figure 1 is a side view of a mail-box to which my improvement has been applied. Fig. 2 is a cross-sectional view of the same on the line $x\,x$, Fig. 3. Fig. 3 is a transverse sectional elevation on the line $y\,y$, Fig. 2. Fig. 4 is a detail sectional plan view on the line $z\,z$, Fig. 2. Fig. 5 is an enlarged detail sectional side elevation on the line $v\,v$, Fig. 3.

The mail-box A may be of the ordinary description shown, provided with a receiving-opening, B, at the top of one side and a discharge-opening, C, at the bottom of its front having a drop-door, D.

To the inside of the box is pivoted, at its upper end, a gravitating bar, E, having an angle-arm, F, on its lower end, arranged to project, when the discharge-door D is opened, outward through the opening C and when said door is closed to be struck thereby and thrown inward.

To the bar E is pivoted between its pivot and arm F one end of a gravity-pawl, G, the other end of which is arranged to rest on a ratchet-wheel, H, fixed on the inner end of a short shaft, I, projecting through an opening, J, made to receive said ratchet-wheel in the side of the mail-box, and mounted to turn in a detachable bearing-plate, K, extending across the opening J.

On the outer end of the shaft I, projecting through the plate K, is fixed an indicating-disk, M, on which are produced characters denoting the times of the mail collections in order, and over the disk is placed a case, N, to which the bearing-plate K is attached, and which has a window, N', in its closed front with which the characters on the disk register in succession, and is attached to the outside of the box by screws or like fastenings. The arrangement is such that when the discharge-door is opened the bar E will swing by gravity outward, thereby drawing the pawl G backward over one tooth of the ratchet-wheel H, and when said door is closed the pawl will engage the ratchet-wheel and turn the same, so as to bring the next time-indicating characters behind the window N'. The inner end of the pawl G is formed with a lug, G', adapted to strike the bar E and prevent the pawl from being displaced when the door is slammed, and a brake, O, is arranged to bear against the periphery of the indicating-disk to steady the rotation of the same in a like emergency. A set-screw, P, is mounted adjustably in the bar E, in position to strike the inside of the box when the door is opened and limit and determine the swing of said bar, so that adjustment can be made to suit any pitch of teeth on the ratchet-wheel. The upper edge of the pawl is formed with a shoulder, Q, adapted to be engaged by a catch, R, fixed on a shank, S, which is mounted to turn in and projects through the side of the box, and has a squared outer end, so that the postman can, by means of an appropriate key, turn said catch R and lock the pawl G and bar E against movement when the door is opened, and thus prevent the door in closing from working the indicator, for the purpose before stated.

The internal operating mechanism is preferably inclosed by a thin metal casing, T.

Having thus described my invention, what I claim as new, and desire to secure by Letters Patent, is—

1. The combination, with a box having a discharge-door, a gravitating bar adapted to be swung by the door, a shouldered pawl connected to the gravitating bar, a ratchet-wheel engaged by the pawl, and indicating devices, substantially as specified, connected with the ratchet-wheel, of a catch adapted to engage the shoulder on the pawl and having a key-shank projecting outward through the wall of the box, substantially as described.

2. As a new article of manufacture, the letter-box having an outer casing, N, inclosing an indicating-disk, M, operated by a gravitating bar, E, provided with an adjustable screw, P, and a pawl, G, a shoulder, Q, on said pawl engaged by catch R on shank S, said catch capable of being operated from without, all substantially as herein shown and described.

HENRY T. SIDWAY.

Witnesses:
H. W. CHRISTIAN,
JAMES F. CASSIDY.